US012564145B2

(12) United States Patent
    Whiteley

(10) Patent No.: US 12,564,145 B2
(45) Date of Patent: Mar. 3, 2026

(54) UNDERGROUND IRRIGATION SYSTEM WITH LIQUID AND GRANULAR ADDITIVE CAPABILITIES

(71) Applicant: Leon James Whiteley, Olivehurst, CA (US)

(72) Inventor: Leon James Whiteley, Olivehurst, CA (US)

( * ) Notice: Subject to any disclaimer, the term of this patent is extended or adjusted under 35 U.S.C. 154(b) by 336 days.

(21) Appl. No.: 18/545,233

(22) Filed: Dec. 19, 2023

(65) Prior Publication Data

US 2025/0194477 A1      Jun. 19, 2025

(51) Int. Cl.
    *A01G 25/06*      (2006.01)

(52) U.S. Cl.
    CPC ..................................... *A01G 25/06* (2013.01)

(58) Field of Classification Search
    CPC ...................................................... A01G 25/06
    See application file for complete search history.

(56) References Cited

U.S. PATENT DOCUMENTS 5,628,262 A *   5/1997   Nelson ................. A01C 17/001
                                                     239/727
5,975,797 A *   11/1999   Thomas ................. A01G 25/06
                                                     405/36

2016/0286742 A1*   10/2016   Kidachi ............... A01G 25/023
2019/0373827 A1*   12/2019   Ensworth ............... A01G 25/06

FOREIGN PATENT DOCUMENTS

GB            2447377 A  *  9/2008  .......... A01M 7/0092

* cited by examiner

*Primary Examiner* — Kyle Armstrong

(74) *Attorney, Agent, or Firm* — Craig A. Simmermon

(57)            ABSTRACT

This invention is an underground irrigation system for turf, trees, vegetables, and/or shrubberies with special clog-proof underground emitters and special in-line containers or vessels that are used to apply liquid and granular additives, such as fertilizer and weed control additives. This underground irrigation system functions for many years without issues such as clogs, broken emitters, punctured lines, or leaks. The only service requirement of this irrigation system in best mode is the replacement of batteries every two years or so. This invention also provides the ability to add liquid and/or power additives that are required to keep turf, trees, vegetables, and shrubbery healthy and free from weeds and other invasive plants. As with all underground irrigation systems, this invention saves a substantial amount of water as compared to any type of above ground irrigation system because there is no water run-off, no leaks, and no evaporation.

3 Claims, 5 Drawing Sheets

WATER IN                    WATER & CHEMICALS OUT

Grid Of
Underground
Emitters

UNDERGROUND IRRIGATION SYSTEM WITH LIQUID AND GRANULAR ADDITIVE CAPABILITIES

BACKGROUND OF THE INVENTION

1. Field of the Invention

This invention relates to an underground irrigation system for turf, trees, vegetables, and/or shrubberies and specifically to an underground irrigation system with special clog-proof underground emitters and multiple special in-line containers or vessels that are used to apply liquid and granular additives, such as fertilizer and weed control additives, to the turf, vegetables, and shrubberies.

2. Description of Related Art

There are other underground irrigation systems in the prior art however none have the special clog-proof underground emitters special in-line containers or vessels used to apply liquid and granular additives to the turf, trees, vegetables, and shrubberies as shown and described below. This invention is a maintenance free irrigation system that functions for many years without issues such as clogs, broken emitters, punctured lines, or leaks. The only service requirement of this irrigation system in best mode is the replacement of batteries every two years or so. This invention also provides the ability to add liquid and/or power additives that are required to keep turf, trees, vegetables, and shrubbery healthy and free from weeds and other invasive plants. As with all underground irrigation systems, this invention saves a substantial amount of water as compared to any type of above ground irrigation system because there is zero run-off of water and zero evaporation of water with underground irrigation systems.

BRIEF SUMMARY OF THE INVENTION

It is an aspect of underground irrigation system with liquid and granular additive capabilities to include at least one irrigation valves that is used to control the irrigation of the plants and/or turf.

It is an aspect of underground irrigation system with liquid and granular additive capabilities to include a removable canister that is used to introduce liquid additives or chemicals to the plants and/or turf.

It is an aspect of underground irrigation system with liquid and granular additive capabilities to include a powder well that is used to dissolve and introduce granular additives or chemicals to the plants and/or turf.

It is an aspect of underground irrigation system with liquid and granular additive capabilities to include a system of above ground pipes and pipe fittings that is used to hydraulically connect many components of the irrigation system together.

It is an aspect of underground irrigation system with liquid and granular additive capabilities to include a system of underground hoses and hose fittings that is used to hydraulically connect many components of the irrigation system together.

It is an aspect of underground irrigation system with liquid and granular additive capabilities to include one or more underground emitters with a root-blocking copper plate.

It is an aspect of each underground emitters with a root-blocking copper plate to be capable of being buried underground and maintaining its integrity from decomposition for at least ten years.

It is an aspect of each underground emitters with a root-blocking copper plate to include an internal pod permanently attached to the inside of a length of hose or tubing.

It is an aspect of each internal pod to include a root-blocking copper plate that is used to prevent roots from clogging the underground emitters.

It is an aspect of copper plate to include an aperture that is used to emit water or chemicals onto the plants and/or turf.

It is an aspect of the length of hose or tubing to include an aperture that is used to emit water or chemicals onto the plants and/or turf

DEFINITION LIST

Figure 1:
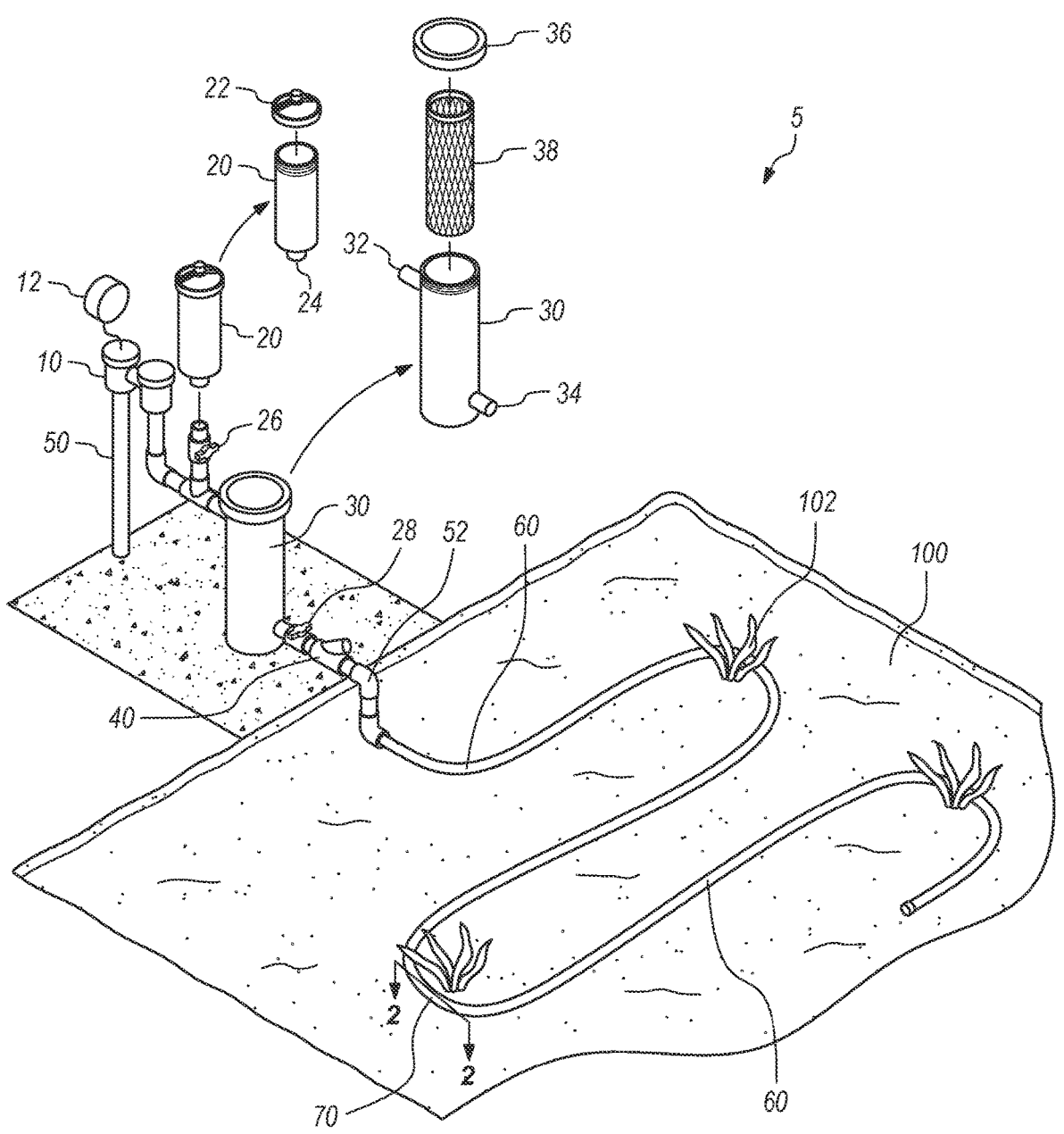
FIG. 1 is a perspective view of underground irrigation system with liquid and granular additive capabilities with an assembly view of the removable canister and an assembly view of the powder well. In this figure, the top soil is not visible so that the system of underground hoses connecting a plurality of underground emitters with root-blocking copper plate can be viewed.

| Term | Definition |
| --- | --- |
| 5 | Underground Irrigation System with Liquid and Granular Additive Capabilities |
| 10 | Irrigation Valve |
| 12 | Irrigation Valve Controller |
| 14 | Manual Valve |
| 20 | Removable Canister |
| 22 | Removable Lid on Removable Canister |
| 24 | Drain Port on Removable Canister |
| 26 | Liquid Additive Valve |
| 28 | Granular Additive Valve |
| 30 | Powder Well |
| 32 | Entry Port on Powder Well |
| 34 | Exit Port on Powder Well |
| 36 | Removable Lid on Powder Well |
| 38 | Removable Grate in Powder Well |
| 40 | Pressure Regulator |
| 50 | Above Ground Pipes |
| 52 | Above Ground Pipe Fittings |
| 60 | Underground Hose |
| 62 | Underground Hose Fittings |
| 70 | Underground Emitter with Root-Blocking Copper Plate |
| 72 | Length of Emitter Hose or Tubing |
| 74 | Internal Pod |
| 76 | Side on Internal Pod |

-continued

| Term | Definition |
|------|-----------|
| 78 | Copper Plate on Internal Pod |
| 80 | Aperture in Copper Plate |
| 82 | Aperture in Length of Emitter Hose or Tubing |
| 100 | Ground Level |
| 102 | Tree, Shrubbery, Vegetable, or Plant |
| 104 | Turf or Grass |
| 106 | Boundary of Turf or Grass Section |
| 108 | Boundary of Tree, Shrubbery, Vegetable, or Plant |

DETAILED DESCRIPTION OF THE INVENTION

Underground irrigation system with liquid and granular additive capabilities 5 provides many benefits over other irrigation systems including: substantial water savings, watering the roots where its required, zero water run-off, zero ultraviolet light degradation of irrigation systems components, zero broken emitters, zero leaks, zero maintenance required from landscapers or anyone, and more.

Underground irrigation system with liquid and granular additive capabilities 5 comprises: at least one irrigation valve 10; an irrigation valve controller 12; a removable canister 20; a powder well 30; a plurality of above ground pipes 50; a plurality of above ground pipe fittings 52, one or more lengths of underground hose 60; one or more underground hose fittings 62; and one or more underground emitters with root-blocking copper plate 70.

Irrigation valve 10 is an automated valve that automatically opens and closes to regulate or control the flow of water or chemical solution into underground irrigation system with liquid and granular additive capabilities 5. When open, the irrigation valve 10 allows water or chemical solution to pass through the irrigation valve 10. When closed, the irrigation valve 10 prevents water or chemical solution from passing through the irrigation valve 10. Irrigation valve 10 opens by opening a diaphragm (not depicted) within the irrigation valve 10 and closes by closing a diaphragm within irrigation valve 10. The diaphragm in the irrigation valve 10 is opened and closed by an electrical solenoid. Typically, when the electrical solenoid is powered with electrical power or voltage, the diaphragm opens, and when the electrical solenoid is not powered with electrical power or voltage, the diaphragm closes from force provided by a spring inside the irrigation valve 10. The diaphragm inside the irrigation valve 10 functions as the valve. Irrigation valve 10 is a well-known product in the field of irrigation. Any known type of irrigation valve may be used. Irrigation valve 10 has an inlet and an outlet. The inlet is connected to: a county, city, or town water line; a well; or any other pressurized water source by above ground pipes 50 and/or above ground pipe fittings 52 to form an airtight and watertight connection with county, city, or town water line; a well; or any other pressurized water source. The outlet is connected to removable canister 20 by above ground pipes 50 and/or above ground pipe fittings 52 to form an airtight and watertight connection with removable canister 20. Any known type of pipe may be used for above ground pipes 50 such as metal, plastic, composite, or PVC pipe. Any known type of pipe fittings may be used for above ground pipe fittings 52 such as metal, plastic, composite, or PVC pipe. Each of the above ground pipe fittings 52 could be: a coupling, a T-connector, an elbow, a valve, a union, a bushing, a reducer, or any other known type of pipe fitting.

Irrigation valve controller 12 is an electronic device used to operate or control one or more irrigation valves 10. Irrigation valve controller 12 must be connected to or have electrical continuity with an electrical power source. Irrigation valve controller 12 also has electrical continuity with the electrical solenoid in the irrigation valve 10. Irrigation valve controller 12 opens and closes the diaphragm in the irrigation valve 10 by controlling the voltage applied to the electrical solenoid in the irrigation valve 10. Irrigation valve controller 12 has a means of setting the frequency of irrigation, the start time of irrigation, and the duration of irrigation. This means is accomplished by a computer, integrated circuit, or electronic chip (not depicted) in the irrigation valve controller 12. The computer, integrated circuit, or electronic chip is programmed with the date and time and also programmed with the frequency of irrigation, the start time of irrigation, and the duration of irrigation by the user. This is usually done with a user interface on the irrigation valve controller 12. During water times, the irrigation valve controller 12 send power or voltage to one or more irrigation valves 10 in order to open the one or more irrigation valves 10 and to allow irrigation to take place. When the watering time is done or finished, the irrigation valve controller 12 removes power or voltage from the one or more irrigation valves 10 in order to close them and to stop irrigation from taking place. Irrigation valve controller 12 is well-known product in the field of irrigation. Any known type of irrigation valve controller may be used. In best mode, irrigation valve controller 12 is battery powered so that power outages do not disturb the irrigation settings and irrigation cycles.

Removable canister 20 is an airtight and watertight container, vessel, or storage chamber. Removable canister 20 functions to hold liquid additives or chemicals therein in preparation for introducing liquid additives or chemicals into underground irrigation system with liquid and granular additive capabilities 5 and applying the liquid additives or chemicals to the trees, shrubberies, vegetables, or plants 102 and turf or grass 104. Removable canister 20 has a side and a bottom. The side of removable canister 20 is an airtight and watertight barrier. The bottom of removable canister 20 is an airtight and watertight barrier. The side of removable canister 20 is attached to the bottom of removable canister 20 in a manner that is airtight and watertight. The side of removable canister 20 and the bottom of removable canister 20 may be made of any known material such as metal, plastic, or composite. In best mode, the side of removable canister 20 and the bottom of removable canister 20 are integral and made of the same piece of material.

Removable canister 20 further comprises a removable lid on removable canister 22. Removable lid on removable canister 22 is a cover, top, or cap that is reversibly attachable to the side of removable canister 20. Removable lid on removable canister 22 functions to provide access to the removable canister 20 in order to add liquid additives or chemicals into the removable canister 20. As described below, liquid additives or chemicals are required in order to properly maintain the trees, shrubberies, vegetables, or plants 102 and turf or grass 104 that are irrigated and supported by the underground irrigation system with liquid and granular additive capabilities 5. Removable lid on removable canister 22 is removed from the side of removable canister 20 in order to add or pour liquid additives or chemicals into the removable canister 20. Removable lid on removable canister 22 is replaced or reattached to the side of removable canister 20 in order introduce the liquid additives or chemicals into the underground irrigation system with liquid and granular additive capabilities 5. Removable lid on removable canister 22 forms an airtight and watertight connection with the side of removable canister 20 when attached to the side of removable canister 20. Any known type of airtight and watertight connection may be used. In best mode, removable lid on removable canister 22 is threaded onto the side of removable canister 20 wherein female threads on the removable lid on removable canister 22 engage with male threads on the side of removable canister 20 to yield an airtight and watertight connection when removable lid on removable canister 22 is properly torqued down onto the side of removable canister 20. A gasket between these members may be required in order to yield the airtight and watertight connection. Removable lid on removable canister 22 may be made of any known material such as metal, plastic, or composite.

Removable canister 20 further comprises a drain port 24. Drain port 24 is an opening, outlet, or porthole in the bottom of removable canister 20. Drain port 24 allows the removable canister 20 to be attached and connected to the above ground pipes 50 and/or above ground pipe fittings 52 to form a hydraulic connection with the rest of the underground irrigation system with liquid and granular additive capabilities 5. Drain port 24 essentially has a pipe fitting on it to allow the removable canister 20 to be connected above ground pipes 50 and/or above ground pipe fittings 52 in the usual manner in the plumbing arts. Drain port 24 has a male or female threaded connection or a male or female socket connection. In best mode, drain port 24 is connected to a first port on liquid additive valve 26 by above ground pipes 50 and/or above ground pipe fittings 52 to form an airtight and watertight connection with liquid additive valve 26, otherwise, drain port 24 is connected directly to an entry port 32 on powder well 30 by above ground pipes 50 and/or above ground pipe fittings 52 to form an airtight and watertight connection with entry port 32. Note the connection to drain port 24 is a Tee-connection or double connection that hydraulically connects to both the outlet on irrigation valve 10 and to the entry port 37 on powder well 30, as depicted.

Liquid additive valve 26 is a valve or device that regulates, directs, or controls the flow of a fluid by opening, closing, or partially obstructing the passageway. Liquid additive valve 26 has a first port and a second port. Liquid additive valve 26 may be any known type of valve, such as: ball valve, gate valve, needle valve, pinch valve, butterfly valve, or globe valve. In best mode liquid additive valve 26 is a ball valve. As described below, liquid additive valve 26 is opened in order to introduce the liquid additives or chemicals being held in the removable canister 20 into the underground irrigation system with liquid and granular additive capabilities 5 and into the underground hose 60 leading to the underground emitters with root-blocking copper plate 70. Liquid additive valve 26 is an optional element of underground irrigation system with liquid and granular additive capabilities 5.

Powder well 30 is an airtight and watertight container, vessel, or storage chamber. Powder well 30 has a side and a bottom. The side of powder well 30 is an airtight and watertight barrier. The side of powder well 30 has an upper end and a lower end. The bottom of powder well 30 is an airtight and watertight barrier. The lower end of the side of powder well 30 is attached to the bottom of powder well 30 in a manner that is airtight and watertight. The side of powder well 30 and the bottom of powder well 30 may be made of any known material such as metal, plastic, or composite. In best mode, the side of powder well 30 and the bottom of powder well 30 are integral and made of the same piece of material. Powder well 30 functions to hold granular additives or chemicals therein in preparation for introducing granular additives or chemicals into underground irrigation system with liquid and granular additive capabilities 5 and applying the granular additives or chemicals to the trees, shrubberies, vegetables, or plants 102 and turf or grass 104.

Powder well 30 further comprises: an entry port 32 and an exit port 34. Entry port 32 is an opening, inlet, or porthole in the side of powder well 30. Entry port 32 is located adjacent to the upper end of the side of powder well 30. Entry port 32 allows water and/or chemicals to enter into the powder well 30. Entry port 32 allows the powder well 30 to be attached and connected to the above ground pipes 50 and/or above ground pipe fittings 52 to form a hydraulic connection with the rest of the underground irrigation system with liquid and granular additive capabilities 5. Entry port 32 essentially has a pipe fitting on it to allow the powder well 30 to be connected to above ground pipes 50 and/or above ground pipe fittings 52 in the usual manner in the plumbing arts. Entry port 32 has a male or female threaded connection or a male or female socket connection. In best mode, entry port 32 is connected to the second port of liquid additive valve 26 by above ground pipes 50 and/or above ground pipe fittings 52 to form an airtight and watertight connection with liquid additive valve 26, otherwise entry port 32 is connected directly to drain port 24 on removable canister 20 by above ground pipes 50 and/or above ground pipe fittings 52 to form an airtight and watertight connection with drain port 24.

Exit port 34 is an opening, outlet, or porthole in the side of powder well 30. Exit port 34 is located adjacent to the lower end of the side of powder well 30. Exit port 34 allows water and/or chemicals to exit from the powder well 30. Exit port 34 allows the powder well 30 to be attached and connected to the above ground pipes 50 and/or above ground pipe fittings 52 to form a hydraulic connection with the rest of the underground irrigation system with liquid and granular additive capabilities 5. Exit port 34 essentially has a pipe fitting on it to allow the powder well 30 to be connected to above ground pipes 50 and/or above ground pipe fittings 52 in the usual manner in the plumbing arts. Exit port 34 has a male or female threaded connection or a male or female socket connection. In best mode, exit port 34 is connected to a first port on granular additive valve 28 by above ground pipes 50 and/or above ground pipe fittings 52 to form an airtight and watertight connection with granular additive valve 28 and the second port of granular additive valve 28 is connected to a pressure regulator 40 by above ground pipes 50 and/or above ground pipe fittings 52 to form an airtight and watertight connection with pressure regulator 40; otherwise, the exit port 34 on powder well 30 is connected to directly to underground hose 60 by above ground pipes 50 and/or above ground pipe fittings 52 to form an airtight and watertight connection therewith.

Powder well 30 further comprises a removable lid on powder well 36. Removable lid on powder well 36 is a cover, top, or cap that is reversibly attachable to the side of powder well 30. Removable lid on powder well 36 functions to provide access to the powder well 30 in order to add granular additives or chemicals into the powder well 30. As described below, granular additives or chemicals are required in order to properly maintain the trees, shrubberies, vegetables, or plants 102 and turf or grass 104 that are irrigated and supported by the underground irrigation system with liquid and granular additive capabilities 5. Removable lid on powder well 36 is removed from the side of powder well 30 in order to add or scoop granular additives or chemicals into the powder well 30. Removable lid on powder well 36 is replaced or reattached to the side of powder well 30 in order introduce the granular additives or chemicals into the underground irrigation system with liquid and granular additive capabilities 5. Removable lid on powder well 36 forms an airtight and watertight connection with the side of removable canister 20 when attached to the side of removable canister 20. Any known type of airtight and watertight connection may be used. In best mode, removable lid on powder well 36 is threaded onto the side of removable canister 20 wherein female threads on the removable lid on powder well 36 engage with male threads on the side of removable canister 20 to yield an airtight and watertight connection when removable lid on powder well 36 is properly torqued down onto the side of removable canister 20. A gasket between these members may be required in order to yield the airtight and watertight connection. Removable lid on powder well 36 may be made of any known material such as metal, plastic, or composite.

Powder well 30 further comprises a removable grate 38. Removable grate 38 is a basket made of rigid meshed material that is sized to fit inside of or nest inside of powder well 30 as depicted. Removable grate 38 functions to retain pieces of granular additives and prevent them from flowing into the underground hose 60 and the underground emitters with root-blocking copper plate 70 because the pieces of granular additives could clog the underground hose 60 and/or the underground emitters with root-blocking copper plate 70. All fluid entering through the entry port 32 is forced to pass through the removable grate 38 because the entry port 32 lies above the top of the removable grate 38. All fluid entering through the exit port 34 is forced to pass through the removable grate 38 because the exit port 34 lies below the bottom of the removable grate 38. The apertures or holes in the meshed material should be about 0.1 to 0.6 inches. As stated, granular additives or chemicals are required in order to properly maintain the trees, shrubberies, vegetables, or plants 102 and turf or grass 104 that are irrigated and supported by the underground irrigation system with liquid and granular additive capabilities 5. Granular additives are added by removing the removable lid on powder well 36 and then placing the granular additives or chemicals into the removable grate 38. Then the removable lid on powder well 36 is replaced or reattached and the irrigation system is started. Many granular additives or chemicals leave unwanted solid remnants of material after all the important minerals and nutrients are dissolved and passed on to the trees, shrubberies, vegetables, or plants 102 and turf or grass 104. The removable grate 38 allows these unwanted solid remnants or material to be removed. These unwanted solid remnants or material are removed by simply removing the removable grate 38, shaking the removable grate 38 out on the ground, and reinstalling the removable grate 38. Also, removable grate 38 filters all water and chemicals prior to flowing into the underground hose 60 and the underground emitters with root-blocking copper plate 70 thereby preventing clogging in these members. Removable grate 36 may be made of any known material such as metal, plastic, or composite. In best mode, exit port 34 is connected to a first port on a granular additive valve 28 by above ground pipes 50 and/or above ground pipe fittings 52 to form an airtight and watertight connection with granular additive valve 28 and the second port of granular additive valve 28 is connected to a pressure regulator 40 by above ground pipes 50 and/or above ground pipe fittings 52 to form an airtight and watertight connection with pressure regulator 40; otherwise, the exit port 34 on powder well 30 is connected to directly to underground hose 60 by above ground pipes 50 and/or above ground pipe fittings 52 to form an airtight and watertight connection therewith.

Granular additive valve 28 is a valve or device that regulates, directs, or controls the flow of a fluid by opening, closing, or partially obstructing the passageway. Granular additive valve 28 has a first port and a second port. Granular additive valve 28 may be any known type of valve, such as: ball valve, gate valve, needle valve, pinch valve, butterfly valve, or globe valve. In best mode granular additive valve 28 is a ball valve. Granular additive valve 28 is functions as follows. Granular additive valve 28 is closed in order to keep the powder well 30 full of water when the removable lid on powder well 36 is removed from powder well 30. Removable lid on powder well 36 must be removed in order to add granular additives or powder additives into the powder well 30 in preparation for introducing granular additives or chemicals into underground irrigation system with liquid and granular additive capabilities 5 and applying the granular additives or chemicals to the trees, shrubberies, vegetables, or plants 102 and turf or grass 104. Granular additives or chemicals dissolve much more easily and readily when the powder well 30 is full of water. However, a full and wet powder well is not requited as dry granular additives or chemicals may just be dumped into a dry powder well 30 without any water in it. After adding the granular additives or chemicals to the powder well 30, the removable lid on powder well 36 is placed back onto the powder well 30. Then, the granular additive valve 28 is opened. In this condition, when the underground irrigation system with liquid and granular additive capabilities 5 is turned on, the granular additives or chemicals being held in the powder well 30 flow into the underground irrigation system with liquid and granular additive capabilities 5 and into the underground hose 60 leading to the underground emitters with root-blocking copper plate 70. Powder additive valve 28 is an optional element of underground irrigation system with liquid and granular additive capabilities 5 because the system will still function without the powder additive valve 28. Granular additives or chemicals would just be added to a dry powder well 30 and then dissolved and carried to the trees, shrubberies, vegetables, or plants 102 and turf or grass 104 when the irrigation system is turned on with water flowing through it.

Underground irrigation system with liquid and granular additive capabilities 5 may further comprise: a pressure regulator 40. Pressure regulator 40 is a valve that controls the pressure of a fluid to a desired value. A pressure regulator 40 is a commonly known product in the field of irrigation. A pressure regulator 40 is only required when the input water pressure is greater than 20 pounds per square inch (psi). Many city water hookups have pressures of 100 pounds per square inch or more. Any known type of pressure regulator may be used that steps the water pressure down to about 20-25 psi. If a pressure regulator 40 is used, the exit port 34 on powder well 30 is connected to pressure regulator 40 by above ground pipes 50 and/or above ground pipe fittings 52, otherwise the exit port 34 on powder well 30 is connected directly to underground hose 60 by above ground pipes 50 and/or above ground pipe fittings 52 to form an airtight and watertight connection therewith.

As stated, irrigation valve 10, removable canister 20, and powder well 30 are hydraulically connected together by a system of above ground pipes 50 and above ground pipe fittings 52. This whole system of above ground pipes 50 and above ground pipe fittings 52 is hydraulically connected to an underground system comprising: one or more lengths of underground hose 60, one or more underground hose fittings 62, and one or more underground emitters with root-blocking copper plate 70. Each of the one or more lengths of underground hose 60 is length of flexible hose made of material that is capable of being buried underground and maintaining its integrity for at least ten years. Thus, one or more lengths of underground hose 60 must be able to withstand the elements of underground life without deteriorating for many years. There are many types of underground hose available and well-known in the field of irrigation that meet these requirements. Any known type of underground hose may be used. Each of the one or more underground hose fittings 62 is hose fitting that is capable of being buried underground and maintaining its integrity for at least ten years. Thus, each of the one or more underground hose fittings 62 must be able to withstand the elements of underground life without deteriorating for many years. There are many types of underground hose fittings available and well-known in the field of irrigation that meet these requirements. Any known type of underground hose fitting available may be used. One or more underground hose fittings 62 could be: a coupling, a T-connector, an elbow, a union, a bushing, a reducer, or any other known type of hose fitting. Each of the one or more underground emitters with root-blocking copper plate 70 is a special hose fitting that intentionally discharges, releases, effuses, or leaks liquid flowing inside of the hose. Each of the one or more underground emitters with root-blocking copper plate 70 is an underground irrigation emitter that releases about 0.5-1.5 gallons per hour of water or chemical solution under about 25 psi of pressure inside the hose. Each of the one or more underground emitters with root-blocking copper plate 70 may be spliced into underground hose 60 or attached to underground hose 60 using coupling fittings or other underground hose fitting 62.

Figure 2:
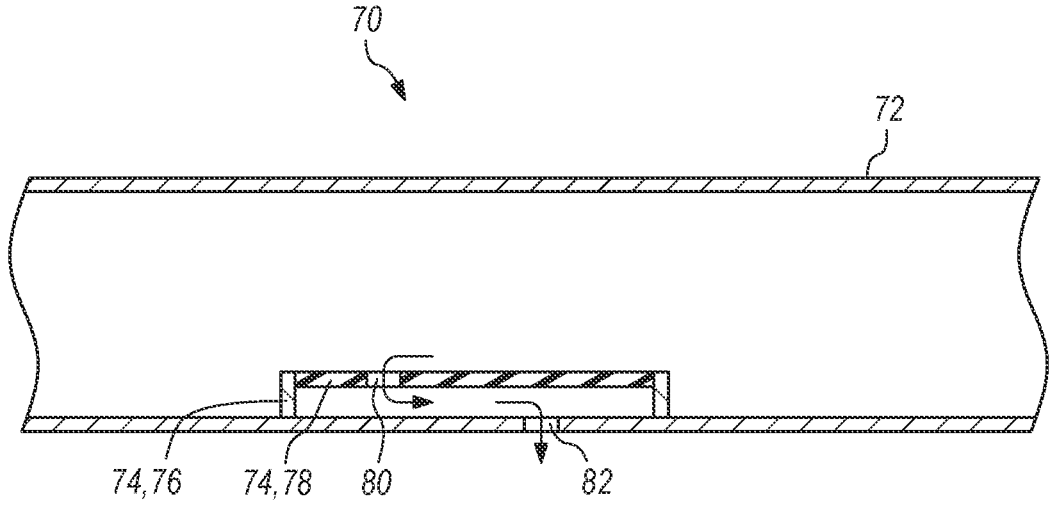
FIG. 2 is a is a cross sectional view of an underground emitters with root-blocking copper plate.
Figure 3:
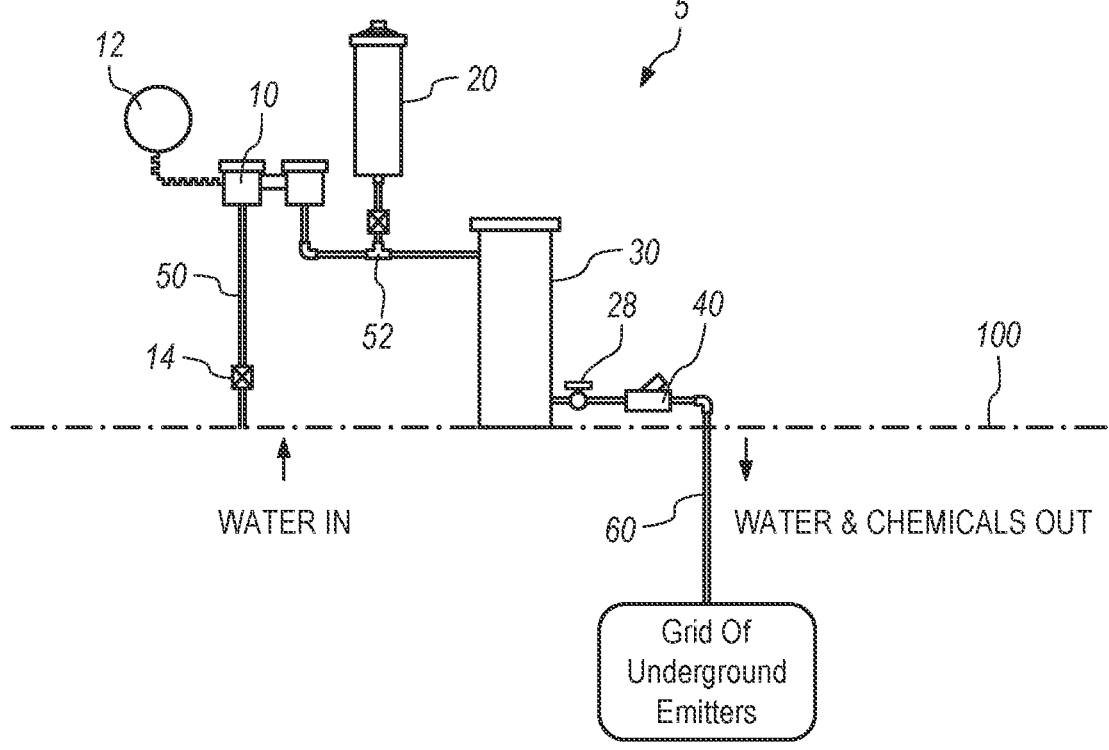
FIG. 3 is a cross sectional view of an embodiment of underground irrigation system with liquid and granular additive capabilities.

Each of the one or more underground emitters with root-blocking copper plate 70 comprises: a length of emitter hose or tubing 72 and an internal pod 74. Each length of emitter hose or tubing 72 is a 6-24 inch long piece of flexible tubing or hose. Each length of emitter hose or tubing 72 has an inside diameter, an outside diameter, an inner surface, and an outer surface. Each length of emitter hose or tubing 72 is made from material that is capable of being buried underground and maintaining its integrity for at least ten years. In best mode, each length of emitter hose or tubing 72 has the same outer diameter as that of underground hose 60. A uniform outside diameter is better so that standard underground hose fittings may be used to connect to both the length of emitter hose or tubing 72 and the underground hose 60. The outer diameter of each length of emitter hose or tubing 72 and underground hose 60 is about 0.375-1.5 inches. In best mode both have a nominal outer diameter of 0.5 inches. The length of emitter hose or tubing 72 may be the same hose or tubing as underground hose 60 or may be a different type of hose or tubing than underground hose 60. Each of the one or more underground emitters with root-blocking copper plate 70 is installed and placed pointing downward so that water or chemical solution is ejected or squirted in a downward direction, as depicted in FIG. 2. Downward placement of each of the one or more underground emitters with root-blocking copper plate 70 is desired because this placement helps reduce roots from the trees, shrubberies, vegetables, or plants 102 and turf or grass 104 from directly growing into the underground emitters with root-blocking copper plate 70 and clogging the underground emitters with root-blocking copper plate 70.

Each internal pod 74 is an airtight and watertight pod that is permanently attached to the inside surface of the length of emitter hose or tubing 72 to form an airtight and watertight connection between these members. Each internal pod 74 is an airtight and watertight pod except for an aperture 80 in a copper plate 78 as described below. Each internal pod 74 has an internal pod side 76 and a copper plate 78. The internal pod side 76 is an airtight and watertight edge, border, or wall that defines the perimeter of the internal pod 74. Internal pod side 76 may be circular, oval, triangular, square, rectangular, or any other shape. Internal pod side 76 has an inner end and an outer end. The outer end of internal pod 74 is permanently attached to the inner surface of the length of emitter hose or tubing 72 so that there is an airtight and watertight connection between these members. Internal pod 74 is attached to the length of emitter hose or tubing 72 at a location where there is an aperture 82 in the length of emitter hose or tubing 72 which is called the emitter hose or tubing aperture 82. Emitter hose or tubing aperture 82 is a hole, gap, vent, or passage way in the length of emitter hose or tubing 72. As described below, water or chemical solution passes through the emitter hose or tubing aperture 82 in order to water and/or fertilize the trees, shrubberies, vegetables, or plants 102 and turf or grass 104. Emitter hose or tubing aperture 82 must be sized to yield a flow of about 0.5-1.5 gallons per hour of water or chemical solution under about 25 psi of pressure inside the length of emitter hose or tubing 72.

Each copper plate 78 is a rigid planar member made of copper with an inner surface and an outer surface. Copper plate 78 may be may be circular, oval, triangular, square, rectangular, or any other shape. The outer surface of copper plate 78 is permanently attached to the outer end of internal pod side 76 so that there is an airtight and watertight connection between these members. This design yields the pod structure or internal pod 74 that is attached to the inner surface of the length of emitter hose or tubing 72. Each copper plate 78 has an aperture 80. Copper plate aperture 80 is a hole, gap, vent, or passage way in copper plate 78. As described below, water or chemical solution passes through copper plate aperture 80 in order to water and/or fertilize the trees, shrubberies, vegetables, or plants 102 and turf or grass 104. Copper plate aperture 80 must be sized to yield a flow of about 0.5-1.5 gallons per hour of water or chemical solution under about 25 psi of pressure inside the length of emitter hose or tubing 72.

Importantly, the copper plate aperture 80 is off-set from emitter hose or tubing aperture 82 as depicted in FIG. 2 so that water or chemical solution cannot pass straight through copper plate aperture 80 and then straight through emitter hose or tubing aperture 82 in a straight line. This off-set forces the flow path of the water or chemical solution to zigzag in order to flow from the copper plate aperture 80 to the emitter hose or tubing aperture 82. This off-set forces the flow path of the water or chemical solution to zigzag inside of internal pod 74 before flowing out of emitter hose or tubing aperture 82. This design is required in order to deter and prevent roots from trees, shrubberies, vegetables, or plants 102 and turf or grass 104 from growing into the emitter hose or tubing aperture 82 and thereby clogging the underground emitter with root-blocking copper plate 70 and cutting off the flow of water or chemical solution to the trees, shrubberies, vegetables, or plants 102 and turf or grass 104. If water or chemical solution is cut-off from trees, shrubberies, vegetables, or plants 102 and turf or grass 104, there is a total failure of irrigation system. As stated above, underground irrigation system with liquid and granular additive capabilities 5 must be maintenance-free for at least ten years which means that each underground emitter with root-blocking copper plate 70 must remain clog-free for at least ten years.

This design of the internal pod 74 with copper plate 78 deters and prevents roots from trees, shrubberies, vegetables, or plants 102 and turf or grass 104 from growing into the emitter hose or tubing aperture 82 as follows. Roots from trees, shrubberies, vegetables, or plants 102 and turf or grass 104 naturally grow towards water and/or the flow of water. Thus, roots from trees, shrubberies, vegetables, or plants 102 and turf or grass 104 sense the flow of water from the emitter hose or tubing aperture 82 and start to grow into the emitter hose or tubing aperture 82. The off-set mentioned above means that the roots from trees, shrubberies, vegetables, or plants 102 and turf or grass 104 grow through the emitter hose or tubing aperture 82 and then straight into the copper plate 78. The roots then attempt to continue to follow the flow of water coming out of the copper plate aperture 80. In so doing, the roots must pass along the outer surface of the copper plate 78 in an attempt to reach the copper plate aperture 80. However, the roots from trees, shrubberies, vegetables, or plants 102 and turf or grass 104 are prevented from growing across the copper plate 78 because of certain inherent properties of the copper in the copper plate 78. Living organisms such as plant roots cannot attach to copper and cannot live on copper. Thus, the roots from trees, shrubberies, vegetables, or plants 102 and turf or grass 104 are essentially killed as they attempt to grow across the copper plate 78. This killing of the roots from trees, shrubberies, vegetables, or plants 102 and turf or grass 104 prevent clogging of the underground emitter with root-blocking copper plate 70. This aspect is crucial to preventing clogging and allows the underground irrigation system with liquid and granular additive capabilities 5 to remain maintenance free and clog free or at least ten years.

Figure 4:
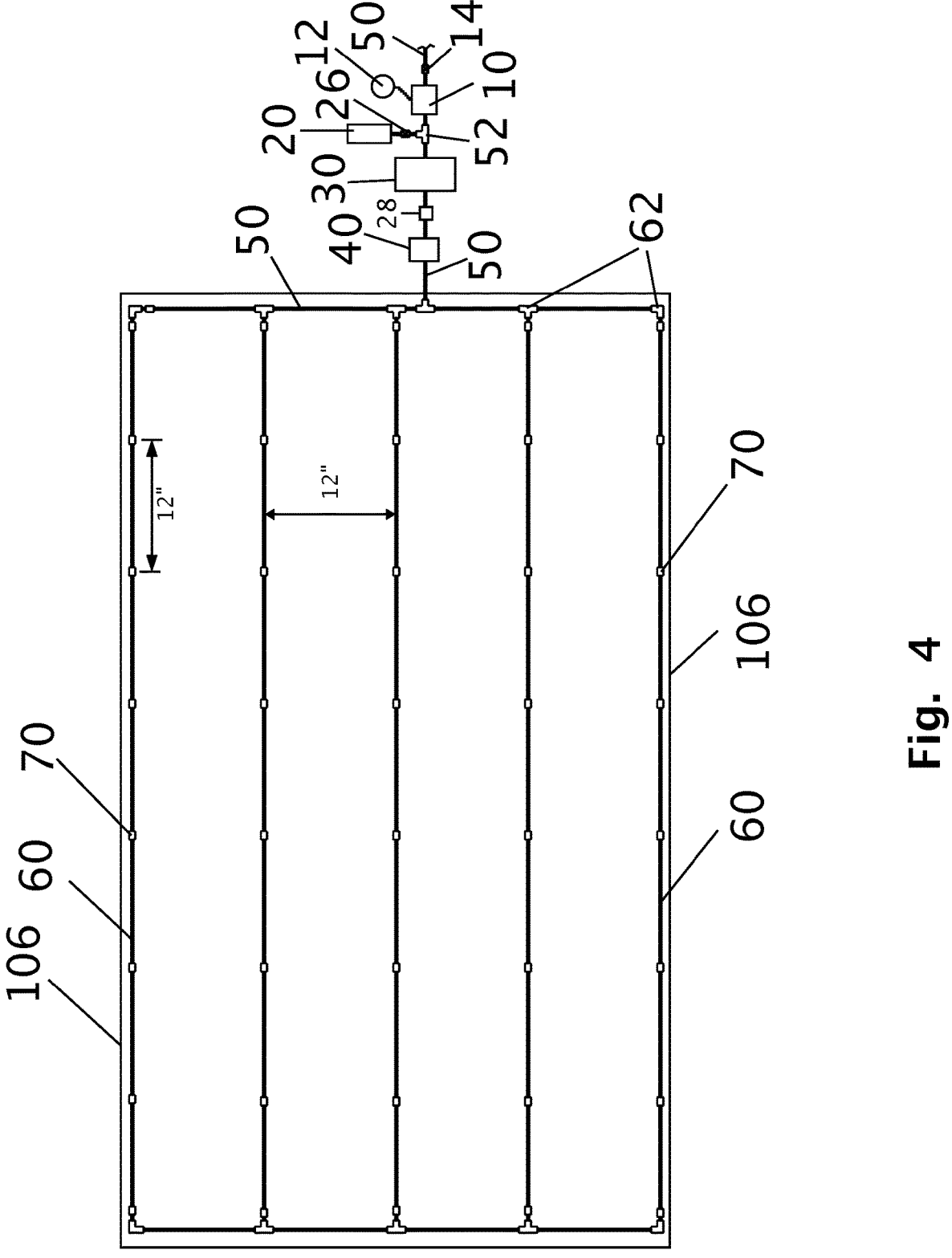
FIG. 4 is a plan view of a typical turf installation or zone of underground irrigation system with liquid and granular additive capabilities.
Figure 5:
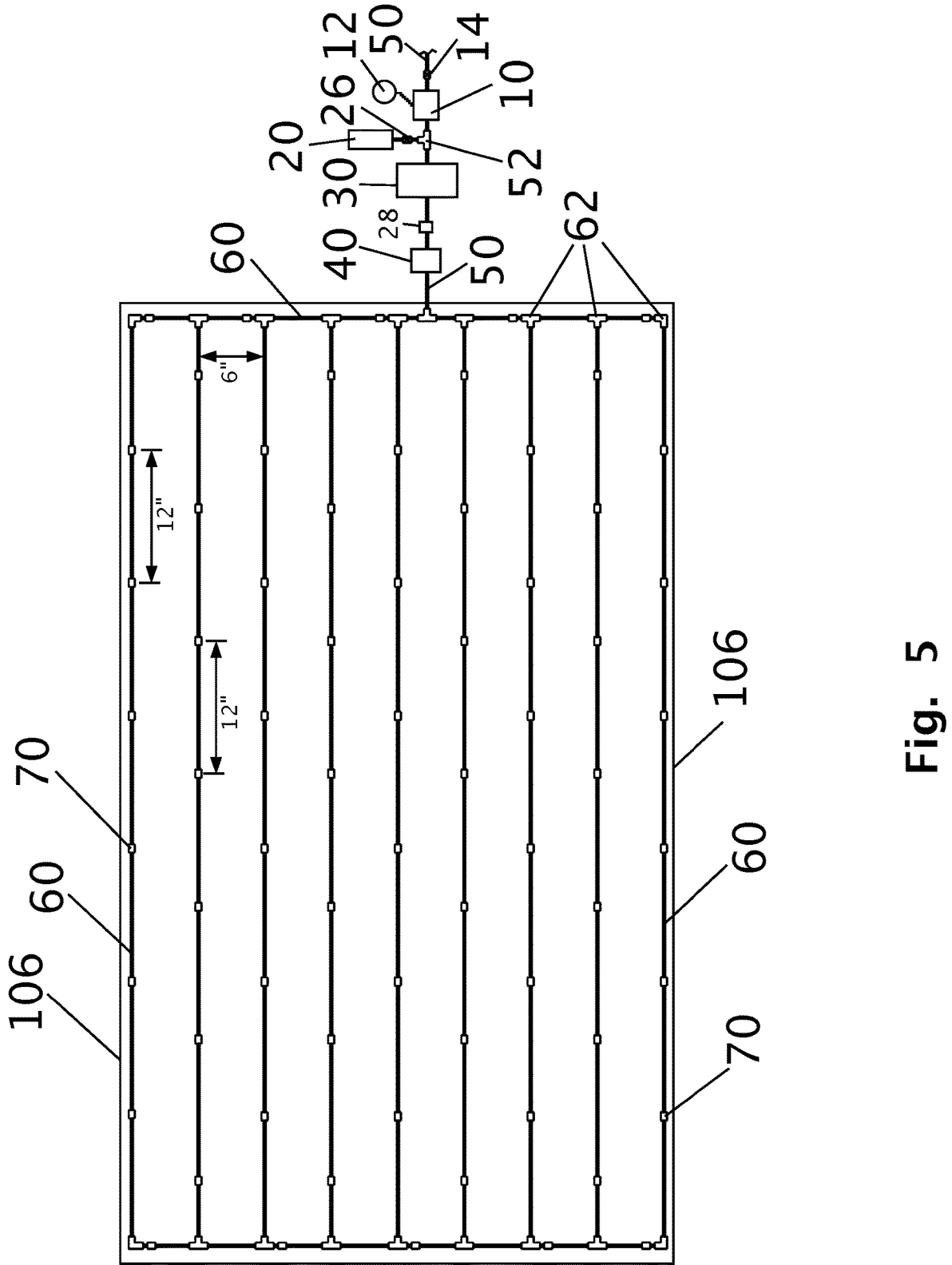
FIG. 5 is a plan view of a turf installation or zone of underground irrigation system with liquid and granular additive capabilities where the turf requires a large volume of watering.
Figure 6:
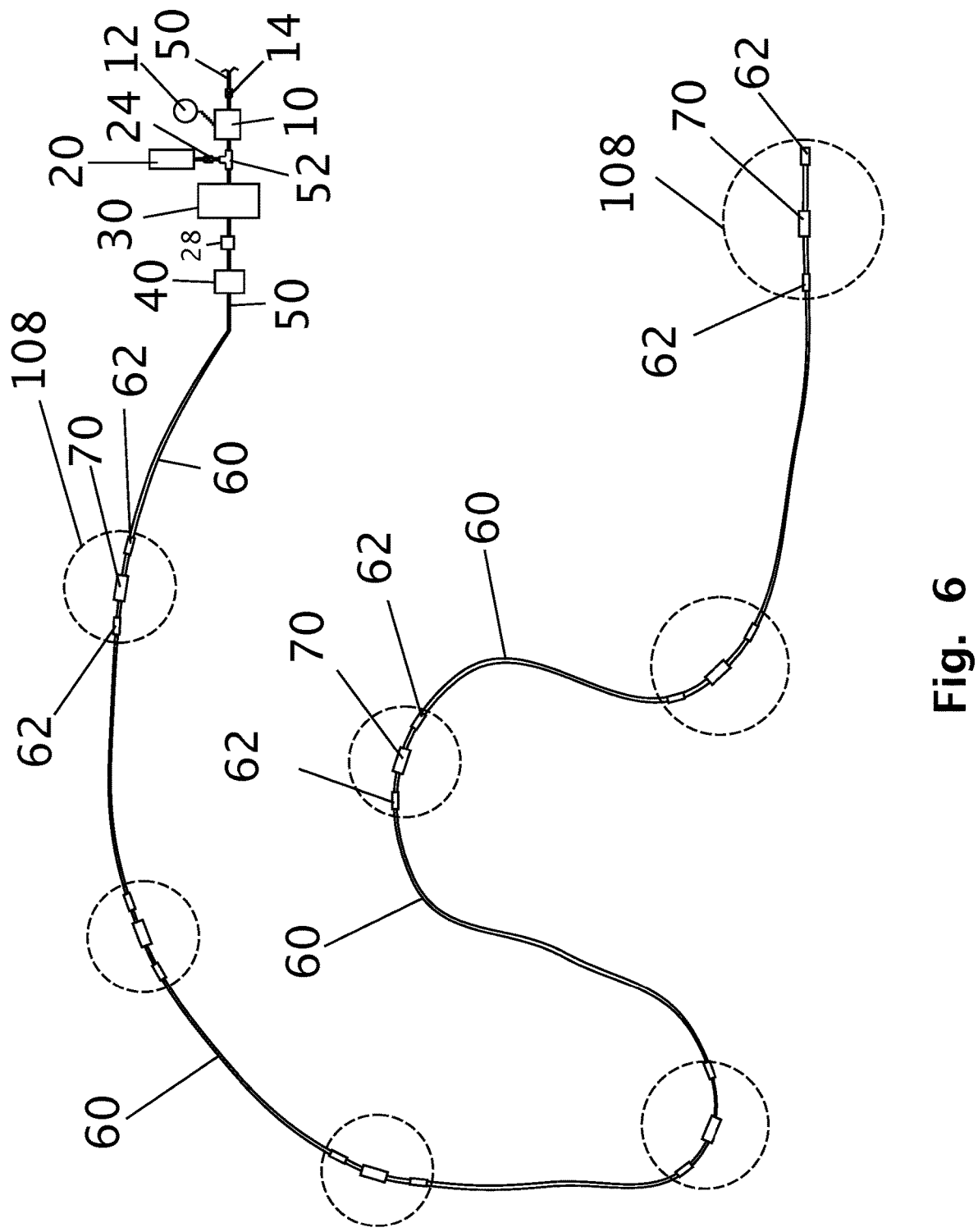
FIG. 6 is a plan view of a typical shrubbery installation or zone of underground irrigation system with liquid and granular additive capabilities.

Underground irrigation system with liquid and granular additive capabilities 5 may be configured in many ways to support any type of trees, shrubberies, or trees, shrubberies, vegetables, or plants 102 as well as any type of turf or grass 104. FIG. 4 depicts a standard type of turf or grass 104 installation wherein underground emitters with root-blocking copper plate 70 are placed at a 12 inch center-to-center distance laterally and longitudinally. FIG. 5 depicts a high-volume type of turf or grass 104 installation wherein underground emitter with root-blocking copper plate 70 are placed at a 12 inch center-to-center distance longitudinally and a 6 inch center-to-center distance laterally. FIG. 6 depicts a standard tree, shrubbery, vegetable, or plant 102 installation wherein various lengths of underground hose 60 are weaved or meandered through the trees, shrubberies, and/or plants 102 with an underground emitter with root-blocking copper plate 70 located above the root ball of each tree, shrubbery, vegetable, or plant 102. Underground irrigation system with liquid and granular additive capabilities 5 may be configured with a plurality of irrigation valves 10 or zones wherein each irrigation valve 10 or zone only controls a small portion of the overall irrigation system that comprises many zones. In some embodiments, each of the underground emitters with root-blocking copper plate 70 are installed directly into the lengths of underground hose 60 because they are purchased from a supplier that way as depicted in FIGS. 4 and 5. Thus, underground hose fittings 62 are not required on these lengths of underground hose 60 because the underground emitters with root-blocking copper plate 70 are installed directly into the underground hose 60. In other embodiments, as stated above, underground hose fittings 62 or couplings 62 are required to splice in the underground emitters with root-blocking copper plate 70 into the underground hose 60 as depicted in FIG. 6.

What is claimed is:

1. An underground irrigation system comprising: at least one irrigation valve; an irrigation valve controller; a removable canister; a powder well; a plurality of above ground pipes; a plurality of above ground pipe fittings, one or more lengths of underground hose; one or more underground hose fittings; and one or more underground emitters with a root-blocking copper plate, wherein, said at least one irrigation valve is an automated valve with an inlet and an outlet;

said inlet is connected to: a county, city, or town water line; a well; or other pressurized water source by said plurality of above ground pipes and/or said plurality of above ground pipe fittings to form an airtight and watertight connection therewith, said irrigation valve controller is an electronic device with electrical continuity with a power source and said at least one irrigation valve;

said removable canister is an airtight and watertight container, vessel, or storage chamber;

said removable canister has a side and a bottom, wherein, said side of said removable canister is an airtight and watertight barrier, said bottom of said removable canister is an airtight and watertight barrier, said side of said removable canister is attached to said bottom of said removable canister to form an airtight and watertight connection therewith, said removable canister further comprises: a removable lid on removable canister, wherein, said removable lid on removable canister is a cover, top, or cap that is reversibly attachable to said side of said removable canister to form an airtight and watertight connection therewith, said removable canister further comprises a drain port, wherein, said drain port is an opening, outlet, or porthole in said bottom of said removable canister, said outlet on said at least one irrigation valve is connected to said drain port on said removable canister by said plurality of above ground pipes and/or said plurality of above ground pipe fittings to form an airtight and watertight connection therewith, said powder well is an airtight and watertight container, vessel, or storage chamber, said powder well has a side and a bottom, wherein, said side of said powder well is an airtight and watertight barrier with an upper end and a lower end, said bottom of said powder well is an airtight and watertight barrier, said lower end of said side of said powder well is attached to said bottom of said powder well to form an airtight and watertight connection therewith, said powder well further comprises: an entry port and an exit port, said entry port is an opening, inlet, or porthole in said side of said powder well, said entry port is located adjacent to said upper end of said side of said powder well, said exit port is an opening, outlet, or porthole in said side of said powder well, said exit port is located adjacent to said lower end of said side of said powder well, said powder well further comprises: a removable lid on powder well, wherein, said removable lid on powder well is a cover, top, or cap that is reversibly attachable to said side of said powder well to form an airtight and watertight connection therewith, said powder well further comprises: a removable grate, wherein, said removable grate is a basket made of rigid meshed material that is sized to fit inside of or nest inside of said powder well and may be removed from said powder well when said removable lid on powder well is removed from said powder well, said drain port on said removable canister is connected to said entry port on said powder well by said plurality of above ground pipes and/or said plurality of above ground pipe fittings to form an airtight and watertight connection therewith, said exit port on said powder well is connected to said one or more lengths of underground hose by said plurality of above ground pipes and/or said plurality of above ground pipe fittings to form an airtight and watertight connection therewith, each said one or more underground emitters with the root-blocking copper plate comprises: a length of emitter hose or tubing and an internal pod, wherein, each said length of emitter hose or tubing is a length of flexible tubing or hose with an inside diameter, an outside diameter, an inner surface, and an outer surface, each said internal pod has an internal pod side and a copper plate, said internal pod side is an airtight and watertight edge, border, or wall that defines said internal pod, said internal pod side has an inner end and an outer end, said outer end of said internal pod is permanently attached to said inner surface of said length of emitter hose or tubing so that there is an airtight and watertight connection between these members at a location where there is an emitter hose or tubing aperture in said length of emitter hose or tubing, said emitter hose or tubing aperture is a hole, gap, vent, or passage way in said length of emitter hose or tubing, said copper plate is a rigid planar member made of copper with an inner surface and an outer surface, said outer surface of said copper plate is permanently attached to said outer end of said internal pod side so that there is an airtight and watertight connection between these members, said copper plate has a copper plate aperture, said copper plate aperture is a hole, gap, vent, or passage way in said copper plate, said copper plate aperture is off-set from said emitter hose or tubing aperture so that said copper plate aperture and said emitter hose or tubing aperture are not aligned or coincident wherein a flow path between said copper plate aperture and said emitter hose or tubing aperture is a zigzag or a Z-shaped flow path, and each said one or more underground emitters with the root-blocking copper plate is connected to said one or more lengths of underground hose to form an airtight and watertight connection therewith.

2. An underground irrigation system comprising: at least one irrigation valve; an irrigation valve controller; a removable canister; a liquid additive valve; a powder well; a plurality of above ground pipes; a plurality of above ground pipe fittings, one or more lengths of underground hose; one or more underground hose fittings; and one or more underground emitters with a root-blocking copper plate, wherein, said at least one irrigation valve is an automated valve with an inlet and an outlet;

said inlet is connected to: a county, city, or town water line; a well; or other pressurized water source by said plurality of above ground pipes and/or said plurality of above ground pipe fittings to form an airtight and watertight connection therewith, said irrigation valve controller is an electronic device with electrical continuity with a power source and said at least one irrigation valve;

said removable canister is an airtight and watertight container, vessel, or storage chamber;

said removable canister has a side and a bottom, wherein, said side of said removable canister is an airtight and watertight barrier, said bottom of said removable canister is an airtight and watertight barrier, said side of said removable canister is attached to said bottom of said removable canister to form an airtight and watertight connection therewith, said removable canister further comprises: a removable lid on removable canister, wherein, said removable lid on removable canister is a cover, top, or cap that is reversibly attachable to said side of said removable canister to form an airtight and watertight connection therewith, said removable canister further comprises a drain port, wherein, said drain port is an opening, outlet, or porthole in said bottom of said removable canister, said liquid additive valve is a valve or device that regulates, directs, or controls fluid flow by opening, closing, or partially obstructing passage therethrough, said liquid additive valve has a first port and a second port, said outlet on said at least one irrigation valve is connected to said first port on said liquid additive valve by said plurality of above ground pipes and/or said plurality of above ground pipe fittings to form an airtight and watertight connection therewith, said second port on said liquid additive valve is connected to said drain port on said removable canister by said plurality of above ground pipes and/or said plurality of above ground pipe fittings to form an airtight and watertight connection therewith, said powder well is an airtight and watertight container, vessel, or storage chamber, said powder well has a side and a bottom, wherein, said side of said powder well is an airtight and watertight barrier with an upper end and a lower end, said bottom of said powder well is an airtight and watertight barrier, said lower end of said side of said powder well is attached to said bottom of said powder well to form an airtight and watertight connection therewith, said powder well further comprises: an entry port and an exit port, said entry port is an opening, inlet, or porthole in said side of said powder well, said entry port is located adjacent to said upper end of said side of said powder well, said exit port is an opening, outlet, or porthole in said side of said powder well, said exit port is located adjacent to said lower end of said side of said powder well, said powder well further comprises: a removable lid on powder well, wherein, said removable lid on powder well is a cover, top, or cap that is reversibly attachable to said side of said powder well to form an airtight and watertight connection therewith, said powder well further comprises: a removable grate, wherein, said removable grate is a basket made of rigid meshed material that is sized to fit inside of or nest inside of said powder well and may be removed from said powder well when said removable lid on powder well is removed from said powder well, said drain port on said removable canister is connected to said entry port on said powder well by said plurality of above ground pipes and/or said plurality of above ground pipe fittings to form an airtight and watertight connection therewith, said exit port on said powder well is connected to said one or more lengths of underground hose by said plurality of above ground pipes and/or said plurality of above ground pipe fittings to form an airtight and watertight connection therewith, each said one or more underground emitters with the root-blocking copper plate comprises: a length of emitter hose or tubing and an internal pod, wherein, each said length of emitter hose or tubing is a length of flexible tubing or hose with an inside diameter, an outside diameter, an inner surface, and an outer surface, each said internal pod has an internal pod side and a copper plate, said internal pod side is an airtight and watertight edge, border, or wall that defines said internal pod, said internal pod side has an inner end and an outer end, said outer end of said internal pod is permanently attached to said inner surface of said length of emitter hose or tubing so that there is an airtight and watertight connection between these members at a location where there is an emitter hose or tubing aperture in said length of emitter hose or tubing, said emitter hose or tubing aperture is a hole, gap, vent, or passage way in said length of emitter hose or tubing, said copper plate is a rigid planar member made of copper with an inner surface and an outer surface, said outer surface of said copper plate is permanently attached to said outer end of said internal pod side so that there is an airtight and watertight connection between these members, said copper plate has a copper plate aperture, said copper plate aperture is a hole, gap, vent, or passage way in said copper plate, said copper plate aperture is off-set from said emitter hose or tubing aperture so that said copper plate aperture and said emitter hose or tubing aperture are not aligned or coincident wherein a flow path between said copper plate aperture and said emitter hose or tubing aperture is a zigzag or a Z-shaped flow path, and each said one or more underground emitters with the root-blocking copper plate is connected to said one or more lengths of underground hose to form an airtight and watertight connection therewith.

3. An underground irrigation system comprising: at least one irrigation valve; an irrigation valve controller; a removable canister; a powder well; a granular additive valve; a plurality of above ground pipes; a plurality of above ground pipe fittings, one or more lengths of underground hose; one or more underground hose fittings; and one or more underground emitters with a root-blocking copper plate, wherein, said at least one irrigation valve is an automated valve with an inlet and an outlet;

said inlet is connected to: a county, city, or town water line; a well; or other pressurized water source by said plurality of above ground pipes and/or said plurality of above ground pipe fittings to form an airtight and watertight connection therewith, said irrigation valve controller is an electronic device with electrical continuity with a power source and said at least one irrigation valve;

said removable canister is an airtight and watertight container, vessel, or storage chamber;

said removable canister has a side and a bottom, wherein, said side of said removable canister is an airtight and watertight barrier, said bottom of said removable canister is an airtight and watertight barrier, said side of said removable canister is attached to said bottom of said removable canister to form an airtight and watertight connection therewith, said removable canister further comprises: a removable lid on removable canister, wherein, said removable lid on removable canister is a cover, top, or cap that is reversibly attachable to said side of said removable canister to form an airtight and watertight connection therewith, said removable canister further comprises a drain port, wherein, said drain port is an opening, outlet, or porthole in said bottom of said removable canister, said outlet on said at least one irrigation valve is connected to said drain port on said removable canister by said plurality of above ground pipes and/or said plurality of above ground pipe fittings to form an airtight and watertight connection therewith, said powder well is an airtight and watertight container, vessel, or storage chamber, said powder well has a side and a bottom, wherein, said side of said powder well is an airtight and watertight barrier with an upper end and a lower end, said bottom of said powder well is an airtight and watertight barrier, said lower end of said side of said powder well is attached to said bottom of said powder well to form an airtight and watertight connection therewith, said powder well further comprises: an entry port and an exit port, said entry port is an opening, inlet, or porthole in said side of said powder well, said entry port is located adjacent to said upper end of said side of said powder well, said exit port is an opening, outlet, or porthole in said side of said powder well, said exit port is located adjacent to said lower end of said side of said powder well, said powder well further comprises: a removable lid on powder well, wherein, said removable lid on powder well is a cover, top, or cap that is reversibly attachable to said side of said powder well to form an airtight and watertight connection therewith, said powder well further comprises: a removable grate, wherein, said removable grate is a basket made of rigid meshed material that is sized to fit inside of or nest inside of said powder well and may be removed from said powder well when said removable lid on powder well is removed from said powder well, said granular additive valve is a valve or device that regulates, directs, or controls fluid flow by opening, closing, or partially obstructing passage therethrough, said granular additive valve has a first port and a second port, said drain port on said removable canister is connected to said entry port on said powder well by said plurality of above ground pipes and/or said plurality of above ground pipe fittings to form an airtight and watertight connection therewith, said exit port on said powder well is connected to said first port on said granular additive valve by said plurality of above ground pipes and/or said plurality of above ground pipe fittings to form an airtight and watertight connection therewith, said second port on said granular additive valve is connected to said one or more lengths of underground hose by said plurality of above ground pipes and/or said plurality of above ground pipe fittings to form an airtight and watertight connection therewith, each said one or more underground emitters with the root-blocking: copper plate comprises: a length of emitter hose or tubing and an internal pod, wherein, each said length of emitter hose or tubing is a length of flexible tubing or hose with an inside diameter, an outside diameter, an inner surface, and an outer surface, each said internal pod has an internal pod side and a copper plate, said internal pod side is an airtight and watertight edge, border, or wall that defines said internal pod, said internal pod side has an inner end and an outer end, said outer end of said internal pod is permanently attached to said inner surface of said length of emitter hose or tubing so that there is an airtight and watertight connection between these members at a location where there is an emitter hose or tubing aperture in said length of emitter hose or tubing, said emitter hose or tubing aperture is a hole, gap, vent, or passage way in said length of emitter hose or tubing, said copper plate is a rigid planar member made of copper with an inner surface and an outer surface, said outer surface of said copper plate is permanently attached to said outer end of said internal pod side so that there is an airtight and watertight connection between these members, said copper plate has a copper plate aperture, said copper plate aperture is a hole, gap, vent, or passage way in said copper plate, said copper plate aperture is off-set from said emitter hose or tubing aperture so that said copper plate aperture and said emitter hose or tubing aperture are not aligned or coincident wherein a flow path between said copper plate aperture and said emitter hose or tubing aperture is a zigzag or a Z-shaped flow path, and each said one or more underground emitters with the root-blocking copper plate is connected to said one or more lengths of underground hose to form an airtight and watertight connection therewith.

* * * * *